3,065,175
PREPARATION OF SUSPENSIONS OF WATER-SOLUBLE SOLIDS IN OLEAGINOUS MEDIA

Edward John Blake and Walter Morrison, Sunbury-on-Thames, England, assignors to The British Petroleum Company Limited, London, England, a joint-stock corporation of Great Britain
No Drawing. Filed Oct. 26, 1959, Ser. No. 848,538
Claims priority, application Great Britain Oct. 31, 1958
17 Claims. (Cl. 252—18)

This invention relates to the preparation of suspensions of water-soluble solids in oleaginous media, such as hydrocarbons, in which the solids are insoluble.

It is often desired to incorporate water-soluble, oil-insoluble solids in oleaginous media, such as mineral lubricating oils and greases. For example, sodium nitrite at about 2% weight concentration is now frequently used as a corrosion inhibitor in lubricating grease. To be effective as a corrosion inhibitor and to eliminate any abrasive tendencies, the crystals of the sodium nitrite must be stably dispersed and of very small particle size, preferably less than 5 microns. The same considerations also often apply to dispersions of other water-soluble solids in other oleaginous media.

One method of obtaining a stable suspension of finely divided particles is to use large amounts of petroleum sulphonates as dispersing agents but it has been stated that the compositions produced are very sensitive to the presence of water and, in the case of greases, tend to lose their structure.

Another method which has recently been proposed for this purpose is to emulsify an aqueous solution of the solid with an oleaginous liquid to form a water-in-oil emulsion using an emulsifying agent capable of forming such an emulsion, and thereafter heating the emulsion to drive off the water. However, when using the emulsifying agents suggested for this technique, e.g. sodium stearate, sodium hydroxystearate, basic calcium alkyl sulphonates and sodium alkyl sulphonate, poor dispersions with large individual crystal sizes were obtained.

We have now found that improved suspensions can be obtained by using a particular material as an emulsifying and dispersing agent.

According to the invention, there is provided a method of preparing a suspension of particles of a water-soluble solid in an oleaginous medium, in which an aqueous solution of the solid is emulsified with an oleaginous liquid to form a water-in-oil emulsion using a vegetable wax as an emulsifying agent, and the emulsion is thereafter dehydrated.

The vegetable wax should preferably be one, the saponification value of which (as measured by IP 136/58) is at least 10, preferably at least 30 units greater than the acid value (as measured by IP 139/57).

Examples of suitable vegetable waxes which may be used are: carnauba wax, candelilla wax, esparto wax, flax wax and ouricury wax.

In carrying out the method of the invention, the vegetable wax may conveniently be dissolved in the oleaginous liquid and the aqueous solution thereafter added. The emulsion may be produced by agitation of the mixture, e.g. by stirring, milling or both. Dehydration of the emulsion may be most conveniently effected by heating, e.g. at a temperature of 115°–170° C. During dehydration by heating it is advisable to continue stirring the emulsion to reduce foaming and to ensure that the emulsion does not break.

The oleaginous liquid may be a mineral oil, e.g. a lubricating oil, a residue, a fuel oil or kerosin. It may also be a vegetable oil, e.g. castor oil, or a synthetic oil, e.g. a diester, a polyglycol, a polyether, or a silicon-containing synthetic oil. In order to produce a lubricating grease containing a dispersion of a water-soluble solid, a dispersion of the solid in lubricating oil prepared as described above may be either mixed with a grease or thickened to a grease consistency in known manner with a grease-forming agent.

Preferably the concentration of water-soluble solid in the final composition is 0.5–25% by weight.

Preferably the amount of vegetable wax used is 0.1–10%, especially 0.5–7.5%, by weight on the oleaginous liquid.

In general it is desirable to use a fairly concentrated solution of the water-soluble solid as this reduces the amount of water which has to be removed from the emulsion. Solutions having a solids concentration of 20–70% wt. are particularly satisfactory.

Water soluble solids which can be suspended in oleaginous media by the method according to the invention include water-soluble corrosion inhibitors such as alkali metal and ammonium nitrites, carbonates, bicarbonates, sulphites, borates, chlorates, perchlorates, hypochlorites, silicates, phosphates, salicylates, citrates, tannates, lactates, tartrates, oxalates, phthalates, acetates, iodaates, arsenites, chromates, molybdates and tungstates, and amine nitrites, phosphates and iodates. However, the invention is not limited to the use of water-soluble solids that are corrosion inhibitors. Examples of other water-soluble solids that may be used include water-soluble extreme pressure agents such as hydroxy fatty acids, polycarboxylic acids, hydroxy polycarboxylic acids, organic salts (e.g. sodium benzoate), amides and amino acids.

A number of examples of the invention will now be described. The vegetable waxes used in the examples had the properties shown in Table I.

TABLE I

| | Carnauba Wax | Candelilla Wax | Exparto Wax | Ouricury Wax | Flax Wax |
|---|---|---|---|---|---|
| Colour | Dark Brown | Light Brown | Middle Brown | Middle Brown | Middle Brown |
| Normal texture at room temperature | Hard and Brittle | Hard and Brittle | Hard and Brittle | Hard and Brittle | Hard and Brittle |
| Melting point (IP 133) °C | 84.1 | 71.1 | 83.5 | 84.8 | 74 |
| Congealing point (IP 78) °C | 77.8 | 67.8 | 70 | 71.1 | -------- |
| Acid Value (IP 139/57) mg. KOH/g | 6 | 11 | 20 | 8 | 14 |
| Saponification Value (IP 136/58) mg. KOH/g | 88 | 68 | 67 | 95 | 77 |

Example 1

Two and a half grams of carnauba wax were dissolved in 100 grams of 150/75 grade lubricating oil (Redwood I viscosity at 140° F.: 150 seconds; viscosity index: 75) by warming and gentle stirring. Fifteen grams of sodium nitrite crystals were dissolved in 30 grams of distilled water and this solution was emulsified with the oil/wax solution using a laboratory mixer operating at 3000 revolutions per minute. The water-in-oil emulsion so formed was then heated to 140° C. to drive off the water while high speed stirring was continued. (Heating to 140° C. took approximately 15 minutes and the dispersion was held at slightly over 140° C. for 1–2 minutes.) The mix was then allowed to cool to atmospheric temperature with gentle stirring.

On examining the anhydrous dispersion of sodium nitrite crystals in oil so formed, under the microscope using polarised light, it was found that a fine even dispersion of sodium nitrite crystals had been obtained, no individual crystal size being greater than 5 microns.

This experiment was repeated using in turn the other waxes listed in Table I and in each case good dispersions were obtained, no individual crystal size being greater than 5 microns.

The experiment was again repeated using, in turn, potassium chromate, sodium benzoate and sodium tungstate in place of sodium nitrite and using candelilla wax as the emulsifying agent. Again, fine even dispersions were obtained, no crystal size being greater than 5 microns.

*Example 2*

10 grams of carnauba wax were dissolved in 500 grams of 150/75 grade lubricating oil. 75 grams of sodium nitrite were dissolved in 150 grams of distilled water and the oil and aqueous solution emulsified by high speed stirring using a laboratory stirrer, followed by milling between Carborundum stones set at 0.001 inch clearance and rotating at 3000 revolutions per minute. The emulsion was then dehydrated by heating to 140° C. with high speed stirring. (Heating time to 140° C. was approximately 30 minutes. The material was held at 140° C. for 1-2 minutes.) A fine dispersion of sodium nitrite was obtained in which individual size was less than five microns.

A batch of lithium base grease was then made in known manner from:

405 grams hardened (hydrogenated) castor oil,
57 grams lithium hydroxide monohydrate, and
2038 grams mineral lubricating oil (150/75 grade).

(Hardened castor oil is essentially glyceryl tri-12-hydroxy-stearate).

When the grease had cooled to 80° C., the sodium nitrite dispersion (which by now had cooled to room temperature) was run into the grease slowly while the grease was being stirred in a grease kettle. The product was then milled and deaerated to give a grease in which the $NaNO_2$ concentration was 2.5% wt. and the vegetable wax concentration, 0.3% wt. Inspection data on the product were as follows:

Penetration at 25° C.—worked: 60 strokes (IP 50/56) _____ 251 mm./10.
Penetration at 25° C.—worked: 100,000 strokes (IP 50/56) _____ 285 mm./10.
Drop point (IP 31) _____ 185° C.
Oil separation on storage at 25° C. (IP 121/57) _____ 0.2% wt.
Bleed test (DTD 825A) _____ 1.7% wt.
Penetration at 25° C. after 4 hours in Shell Roll tester at room temperature (SMS 466) _____ 245 mm./10.
Penetration at 25° C. after 4 hours in Shell Roll tester at 100° C. (SMS 466) _____ 308 mm./10.
$NaNO_2$ particle size _____ Less than $5\mu$.
Corrosion test _____ No rusting observed.

No difficulties were experienced in pumping the grease through a 200 mesh BSS sieve and no agglomeration or crystal growth was observed in the grease after two months' storage.

*Example 3*

By way of comparison, a lithium base grease was made in the same manner as in Example 2 using the following ingredients:

Mineral lubricating oil (as used in Example 2) _____ 85.2% wt.
Hardened castor oil _____ 13.0% wt.
Lithium hydroxide monohydrate ___ 1.8% wt.
No sodium nitrite was added.

Inspection data were as follows:
Penetration at 25° C.—worked:
60 strokes (IP 50/56) _____ 238 mm./10.
Penetration at 25° C.—worked:
100,000 strokes (IP 50/56) _ 289 mm./10.
Penetration at 25° C. after 4 hours in Shell Roll tester at room temperature (SMS 466) . 251 mm./10.
Penetration at 25° C. after 4 hours in Shell Roll tester at 100° C. (SMS 466) _____ 366 mm./10.
Drop point (IP 31) _____ 189° C.
Oil separation on storage at 25° C. (IP 121/57) _____ 2.4% wt.
Bleed test (DTD 825A) _____ 3.9% wt.
Corroision test _____ Severe rusting on all bearing parts.

It appears from the above data that the presence of sodium nitrite in a lithium grease may cause a slight lowering of drop point but this is not significant in terms of rig performance and the drop point of the grease of Example 2 is as good as the drop points of currently marketed lithium greases containing sodium nitrite.

The mill used in the above examples was a Premier colloid paste mill. This is a high speed mill (3000 revolutions per minute) in which the material to be milled is fed between a 5 inch Carborundum rotor and a Carborundum stator, the annular gap being variable up to 0.025 inch.

The corrosion test was carried out in a rig consisting essentially of a 35 millimetre bore, double row, self-aligning ball race fitted with a pressed steel cage and housed in a plummer block. It was operated at 80 revolutions per minute and with no load applied.

The bearing is filled with the grease under test and the housing is packed in such a way as to form a cup round the bearing, 20 millilitres of water are introduced into this cup.

The rig is run (with water present) on 3 consecutive days for 8 hours each day followed by a 3-4 day static period. At the end of this static period the bearing parts are examined for rusting and corrosion.

The use of vegetable waxes in producing the dispersions according to the invention has the following advantages:

(*a*) They are readily available and relatively cheap. No elaborate processing or extraction procedures are required for its production.

(*b*) Greases produced in the manner described above using candelilla wax are not darkened in colour. The other waxes listed produce a darker coloured solid/oil dispersion which causes some darkening of the grease colour to produce a milk chocolate or coffee effect. Thus the dispersants may be chosen to produce dark or light coloured greases as desired.

(*c*) It is not necessary to use evaporation on heated drums or recirculation through fine nozzles during the dehydration step as mentioned in previous proposals for producing dispersions by the emulsification technique.

(*d*) Satisfactory corrosion-inhibited greases may be made using conventional and established grease making equipment, i.e. mills used for grease production and normal open grease kettles.

We claim:

1. A method of preparing a suspension of particles of a water-soluble solid in an oleaginous medium which comprises emulsifying an aqueous solution of the solid with an oleaginous liquid and a vegetable wax to form a water-in-oil emulsion, and thereafter dehydrating the emulsion.

2. A method according to claim 1, in which the vegetable wax in one selected from the group consisting of carnauba wax, candelilla wax, esparto wax, flax wax and ouricury wax.

3. A method according to claim 1, in which the vegetable wax has a saponification value of at least 10 units greater than its acid value.

4. A method according to claim 3, in which the vegetable wax has a saponification value of at least 30 units greater than its acid value.

5. A method according to claim 1, in which the vegetable wax is dissolved in the oleaginous liquid and the aqueous solution thereafter added.

6. A method according to claim 1, in which the emulsion is produced by agitating the oleaginous and aqueous phases.

7. A method according to claim 1, in which the dehydration of the emulsion is effected by heating.

8. A method according to claim 7, in which the heating is carried out at a temperature of 115–170° C.

9. A method according to claim 1, in which the oleaginous liquid is a lubricating oil.

10. A method according to claim 9, in which the lubricating oil is a mineral lubricating oil.

11. A method according to claim 1, in which the amount of vegetable wax used is 0.1–10% by weight of the oleaginous liquid.

12. A method according to claim 11, in which the amount of vegetable wax used is 0.5–7.5% by weight of the oleaginous liquid.

13. A method according to claim 1, in which the aqueous solution has a solids concentration of 20–70% by weight.

14. A method according to claim 1, in which the concentration of water-soluble solid suspended in the final composition is 0.5–25% by weight.

15. A method according to claim 1, in which the water-soluble solid is sodium nitrite.

16. In a method of producing a lubricating grease containing a suspension of particles of a water-soluble solid, the improvement which comprises preparing a suspension of particles of the water-soluble solid in a lubricating oil in a manner as specified in claim 9, and mixing the resulting suspension with a grease.

17. In a method of producing a lubricating grease containing a suspension of particles of water-soluble solid, the improvement which comprises preparing a suspension of particles of the water-soluble solid in a lubricating oil in a manner as specified in claim 9, and thickening the resulting suspension to a grease consistency with a grease-forming agent.

References Cited in the file of this patent

UNITED STATES PATENTS

| | | |
|---|---|---|
| 2,235,161 | Morway et al. | Mar. 18, 1941 |
| 2,342,199 | Hurtt | Feb. 22, 1944 |
| 2,758,085 | Oberright | Aug. 7, 1956 |
| 2,921,899 | Sproule et al. | Jan. 19, 1960 |

FOREIGN PATENTS

| | | |
|---|---|---|
| 778,822 | Great Britain | July 10, 1957 |

UNITED STATES PATENT OFFICE
CERTIFICATE OF CORRECTION

Patent No. 3,065,175            November 20, 1962

Edward John Blake et al.

It is hereby certified that error appears in the above numbered patent requiring correction and that the said Letters Patent should read as corrected below.

Column 2, TABLE I, first column, line 5 thereof, for "(IP 78)" read -- (IP 76) --; same TABLE I, first column, lines 8 and 9 thereof, for "(IP 126 58)" read -- (IP 136/58) --; same TABLE I, third column, line 6 thereof, for "71.1" read -- 71.7 --; column 4, line 13, for "Corroision" read -- Corrosion --.

Signed and sealed this 18th day of June 1963.

(SEAL)
Attest:

ERNEST W. SWIDER
Attesting Officer

DAVID L. LADD
Commissioner of Patents